United States Patent
Engelhardt

(10) Patent No.: US 6,844,965 B1
(45) Date of Patent: Jan. 18, 2005

(54) APPARATUS FOR OPTICAL SCANNING OF MULTIPLE SPECIMENS

(75) Inventor: Johann Engelhardt, Bad Schoenborn (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 0 days.

(21) Appl. No.: 09/681,008

(22) Filed: Nov. 15, 2000

(30) Foreign Application Priority Data

Nov. 29, 1999 (DE) .......................................... 199 57 413

(51) Int. Cl.⁷ .................. G02B 21/26; G02B 21/00; H01J 65/08
(52) U.S. Cl. .................. 359/394; 359/368; 359/383; 359/44.19; 435/6; 250/458.1; 204/224 M
(58) Field of Search ............... 359/368, 394, 359/383, 192, 44.19; 250/216, 234, 235, 458.1; 356/139, 237.2, 310; 369/44.19, 44.15, 44.21, 44.12, 192; 435/6; 204/224 M

(56) References Cited

U.S. PATENT DOCUMENTS

| | | | | |
|---|---|---|---|---|
| 3,625,586 A | * | 12/1971 | Olexa ........................... 350/90 |
| 4,191,940 A | * | 3/1980 | Polcyn et al. ............. 340/146.3 |
| RE30,974 E | * | 6/1982 | De Moss et al. ........... 386/126 |
| 4,725,736 A | * | 2/1988 | Crewe ..................... 250/396 R |
| 5,216,247 A | * | 6/1993 | Wang et al. ................. 250/236 |
| 5,531,874 A | * | 7/1996 | Brophy et al. ......... 204/224 M |
| 5,532,874 A | * | 7/1996 | Stein .......................... 359/394 |
| 5,752,695 A | * | 5/1998 | Jehan et al. ................... 271/14 |
| 5,881,045 A | * | 3/1999 | Inoue ........................ 369/75.1 |
| 6,103,479 A | * | 8/2000 | Taylor ........................ 435/7.2 |
| 6,201,639 B1 | * | 3/2001 | Overbeck .................... 359/210 |
| 6,239,426 B1 | * | 5/2001 | Muramatsu et al. ........ 250/234 |
| 6,248,988 B1 | * | 6/2001 | Krantz ..................... 250/201.3 |
| 6,262,838 B1 | * | 7/2001 | Montagu .................... 359/391 |
| 6,275,454 B1 | * | 8/2001 | Boutaghou et al. ...... 369/44.19 |
| 6,335,824 B1 | * | 1/2002 | Overbeck .................... 359/368 |
| 6,342,349 B1 | * | 1/2002 | Virtanen ......................... 435/6 |
| 6,484,602 B1 | * | 11/2002 | Dagalakis et al. ........ 74/490.08 |
| 6,548,796 B1 | * | 4/2003 | Silvermintz et al. ..... 250/201.3 |
| 6,586,750 B2 | * | 7/2003 | Montagu et al. ......... 250/458.1 |

\* cited by examiner

*Primary Examiner*—Nikita Wells
*Assistant Examiner*—Kalimah Fernandez
(74) *Attorney, Agent, or Firm*—Houston Eliseeva LLP

(57) ABSTRACT

An apparatus for optical scanning of multiple specimens (1) and/or specimen regions, the specimens (1) being associated with a specimen receiving device (2) and being optically scannable by a scanning device (3), is easy to operate for data recording of many specimens in the shortest possible time, using simple and economical optical system components. The apparatus according to the present invention is characterized in that the specimen receiving device (2) is rotatable about an axis (4).

19 Claims, 3 Drawing Sheets

APPARATUS FOR OPTICAL SCANNING OF MULTIPLE SPECIMENS

CROSS REFERENCE TO RELATED APPLICATIONS

This invention claims priority of a German patent application DE-199 57 413.8 which is incorporated by reference herein.

BACKGROUND OF INVENTION

The present invention concerns an apparatus for optical scanning of multiple specimens, the specimens being associated with a specimen receiving device and being optically scannable by a scanning device. In addition to that the invention concerns as well with an apparatus for scanning multiple specimen regions on a large specimen.

Arrangements of the generic type are used in particular for the detection of "micro-array biochips" (MABs). MABs are used in medical diagnostics, where a large number of MABs need to be examined and evaluated in a brief period of time. Specimen holders on which a large number of specific detection regions ("spots") are placed, preferably in a grid pattern, are among the devices that can be used as MABs. These detection regions usually have a diameter of approximately 50 to 100 $\mu$m and need to be examined in terms of their fluorescence properties. The spots are distributed on a specimen holder over a specimen field of up to 22×60 mm.

Specimens distributed over such large object fields cannot be simultaneously imaged with a conventional confocal laser scanning microscope (CLSM), however, since the object fields of microscope objectives suitable for such applications are too small for the purpose. The use of larger objectives or lenses, with a beam that is moved relative to the lenses, results in image irregularities and intensity fluctuations. The image irregularities are caused by residual or imaging errors in the lenses used, and the intensity fluctuations by partial contamination of the optical components in the beam path.

In addition, the illumination beam path of CLSMs is configured in such a way that the diffraction-limited scanning beam generally has, a diameter in the specimen plane in the range of 1–2 $\mu$m. As a result, the specimens are scanned with a spatial resolution that is unnecessary and much too high for these applications. Laboratory use, in particular, demands a high throughput of specimen holders for examination, which is not attainable with presently known CLSMs. The operation of CLSMs is moreover complex, and requires considerable operating experience on the part of the user.

SUMMARY OF INVENTION

It is therefore the object of the present invention to describe an apparatus for automatic optical scanning of multiple specimens and/or specimen regions, with which data recording from multiple specimens in a short period of time is possible. In this context, the optical system components are intended to be economical and of simple design. The entire system should be easy to use.

The aforesaid object is achieved by an apparatus which comprises a specimen receiving device for holding the specimens, a scanning device provided for optically scanning the specimens, the specimen receiving device defines an axis of rotation and the scanning device is arranged movably relative to the specimen receiving device.

What has been recognized according to the present invention is firstly that data recording from many specimens or specimen regions in a short period of time can be achieved by way of a rotating specimen receiving device. In particular, the rotary motion of the specimen receiving device advantageously makes it possible to optically scan the same specimen several times, so as thereby, for example, to be able to compare multiple measurement results from the same specimen to one another. This is important principally for statistical evaluation of the measured specimens. For data recording from many specimens in the shortest possible time, the specimen receiving device can be of correspondingly large dimensions so that as many specimens or specimen holders as possible can be detected in one measurement pass.

The specimen receiving device could rotate in opposite directions. For example, after the specimens have been optically scanned once, the specimen receiving device could be rotated in the opposite direction. It is also conceivable for the specimen receiving device to rotate in only one direction, preferably continuously.

In a preferred embodiment, the scanning device is arranged movably relative to the specimen receiving device. This advantageously allows the entire region of the specimen receiving device to be optically scanned. For this purpose, the scanning device or the specimen receiving device could be linearly displaceable. This displacement or relative motion between scanning device and specimen receiving device could occur in the radial direction. The linear relative motion could also proceed along a secant.

In a further embodiment, the scanning device is arranged rotatably or pivotably about a further axis, so that the relative motion between scanning device and specimen receiving device is accomplished by way of a rotation of the scanning device. A rotation of the specimen receiving device about a further axis is also conceivable if the scanning device is arranged in stationary fashion.

In additionally advantageous fashion, the optical distance between the specimen land the scanning device is substantially constant in the context of a relative motion between the scanning device and the specimen receiving device. The principal result of this is to ensure that a defined specimen region is optically scannable, namely preferably the region in which the specimens to be scanned are in fact located. The condition that the optical distance between the specimen receiving device and the scanning device remain substantially constant during a relative motion can be achieved by way of a corresponding arrangement of the axis of the specimen receiving device relative to the direction of motion of the scanning device. If the relative motion between the scanning device and the specimen receiving device is accomplished by rotation or pivoting of the scanning device about a further axis, the requirement for a constant optical distance between the specimen receiving device and the scanning device can be met by a substantially parallel arrangement of the two rotation or pivot axes. In particular when focused scanning light is used, the aforementioned features ensure that the specimens to be scanned are always, when viewed from the scanning device, located in the same position in the optical beam path.

In the context of an alternative embodiment, the specimen receiving device has a constant rotation speed. In particular, the rotation speed of the specimen receiving device is kept constant during optical scanning or data recording. The rotation speed could have a value that lies in a range from one to three hundred revolutions per minute.

It is also conceivable for the specimen receiving device to have a variable rotation speed. In this context, the rotation speed could be dependent on the relative position between the specimen receiving device and the scanning device. The region to be scanned that is close to the axis of the specimen receiving device in the radial direction supplies less specimen information per revolution than a region that is farther away from the axis of the specimen receiving device, since the circumference scanned with each revolution changes. A modifiable rotation speed could advantageously make allowances for this situation, namely the fact that the rotation speed is dependent on the detected data stream of the scanning device. The specimen receiving device could consequently have a steadily increasing rotation speed, while optical scanning by the scanning device is accomplished radially outward from a region close to the axis of the specimen receiving device.

The specimen receiving device can have a large mass. This is advantageous in particular when the specimen receiving device rotates at a constant rotation speed. To prevent or minimize any rotational imbalance of the specimen receiving device, the latter is configured in rotationally symmetrical fashion with uniform mass distribution.

Concretely, the specimen receiving device could be configured so that it can receive different inserts. It would be conceivable, for example, for the specimen receiving device to receive a single, replaceable specimen vessel. This specimen vessel could be a conventional Petri dish or a culture vessel.

The specimen receiving device could also have a replaceable carousel insert. This carousel insert could receive individual specimen holders within it. Suitable specimen holders include conventional glass specimen holders that are usual in microscopy. Other specimen holders, for example from the field of MABs, are also usable. The individual specimen holders are arranged in the carousel insert with single-point symmetry with respect to the rotation center of the specimen receiving device, so that no imbalance occurs as the specimen receiving device rotates about its rotation axis.

Advantageously, the individual specimen holders are positionable in a predefinable plane in the carousel insert with retaining means. Concretely, the individual specimen holders are positioned resiliently or with spring force. This spring force presses the specimen holder against the retaining means. With this feature, a carousel insert can be loaded in the shortest possible time with specimen holders, including, in particular, in routine operation. This also ensures that all the specimen holders are positioned in one predefinable plane.

With regard to the statistical analysis of a plurality of specimen holders, the individual specimen holders are equipped with a specific identifier. This identifier could be configured, for example, in the form of a barcode, associated with which is information concerning the relevant experiment, the measurement series, or an assignment to a patient.

According to a further embodiment, autofocusing of the specimens is provided. Autofocusing can be accomplished by way of a corresponding focusing optical system that is arranged in the scanning device. Corresponding positioning of the scanning device relative to the specimen receiving device would also be conceivable. Autofocusing of the specimens can ensure that all the specimens to be scanned are in fact imaged in focus. Autofocusing of the specimens could be implemented using known methods. Concretely, autofocusing could be performed using the triangulation method.

In the context of a further embodiment, the surface of the rotating specimen receiving device has a deviation in the direction of the optical axis of the scanning device that is preferably less than 20 $\mu$m. Alternatively, the surface of the specimen vessel or of the specimen holder located in the carousel insert has a maximum deviation in the direction of the optical axis of the scanning device that also is preferably less than 20 $\mu$m. As a result of this feature it would be possible to dispense with an autofocusing device, thereby simplifying data recording and allowing equipment costs to be reduced.

The specimens are scannable with at least one laser beam. The corresponding measurement signals are detected with at least one detector. In this context, the laser beam could scan in at least one direction relative to the scanning device. Alternatively, the laser beam could be stationary relative to the scanning device. A laser beam that is stationary relative to the scanning device is to be preferred to a scanning laser beam in terms of simpler alignment and cost-reducing production.

In a further embodiment, scanning is accomplished with laser light of different wavelengths. This is of considerable advantage in particular when specimens specifically marked with different fluorescent dyes are to be scanned. In this case the fluorescence signals could be detected with multiple detectors.

If multiple laser beams are used simultaneously, the beam path of the scanning device could be configured such that each laser beam illuminates a different specimen region. As an alternative to this, in particular when multiple laser beams of different wavelengths are used, all the laser beams could illuminate the same specimen region.

In additionally advantageous fashion, the axial extent of the focus region of the laser beam in the specimen region is less than 40 $\mu$m. In this respect as well it is possible to dispense with the use of an autofocusing system if the maximum deviation of the surface of the rotating specimen region always has a maximum deviation [sic] in the direction of the optical axis that is less than 20 $\mu$m. With suitable axial positioning of the scanning device, all the specimens associated with the specimen receiving device are moved through the focus region of the scanning device during the entire data recording operation.

In terms of the size of the specimens to be examined or scanned, the lateral extent of the focus region of the laser beam in the specimen region is between 5 $\mu$m and 200 $\mu$m. Ultimately the lateral extent of the focus region of the laser beam in the specimen region must be selected in such a way that the scanning theorem is satisfied in terms of the average size of the specimens being scanned. The diameter of the laser focus in the lateral direction in the specimen region must thus be less than or equal to half the average specimen diameter.

The axial and/or lateral extent of the focus region of the laser beam in the specimen region can be adjusted by way of the optical beam path within the scanning device. In particular, the optical beam path of the scanning device can be of confocal configuration.

The incidence angle of the laser beam onto the surface of the specimen receiving device, the specimen vessel, or the specimen holder is selected in such a way that it differs from zero. This advantageously makes it possible to suppress the principal return reflection of the exciting light resulting, for example, from the transition between specimen holder and air or to block it out from the excitation and detection beam path. This is important in particular for the detection of fluorescent light, since it is then possible to use a (bandpass) blocking filter of lower strength, and the corresponding detector can thus detect the fluorescent light more effectively. An incidence angle for the laser beam differing from zero can be implemented by the fact that either the entire optical arrangement in the scanning device, or only a single mirror, is correspondingly mounted or aligned. What must ultimately be ensured is that the laser beam striking the surface of the specimen receiving device, the specimen vessel, or the specimen holder is at a corresponding angle relative to the axis of the specimen receiving device.

In the interest of unequivocal data analysis, the specimen receiving device, the specimen vessel, or the carousel insert has synchronization markings. These could, for example, be detected by a photoelectric barrier. This makes possible an unequivocal association between the scanned image data and the corresponding positions of the specimen receiving device.

According to a further embodiment, provision is made for a back-transformation of the measured image data, present in cylindrical coordinates, into Cartesian coordinates. The information of the synchronization markings of the specimen receiving device, the specimen vessel, or the carousel insert is utilized for this purpose as well.

BRIEF DESCRIPTION OF DRAWINGS

There are various ways of advantageously embodying and developing the teaching of the present invention. Reference is made to the explanation below of exemplary embodiments of the invention with reference to the drawings. In conjunction with the explanation of the preferred exemplary embodiments of the invention with reference to the drawings, a general explanation is also given of preferred embodiments and developments of the teaching. In the drawings.

DETAILED DESCRIPTION

Figure 1:
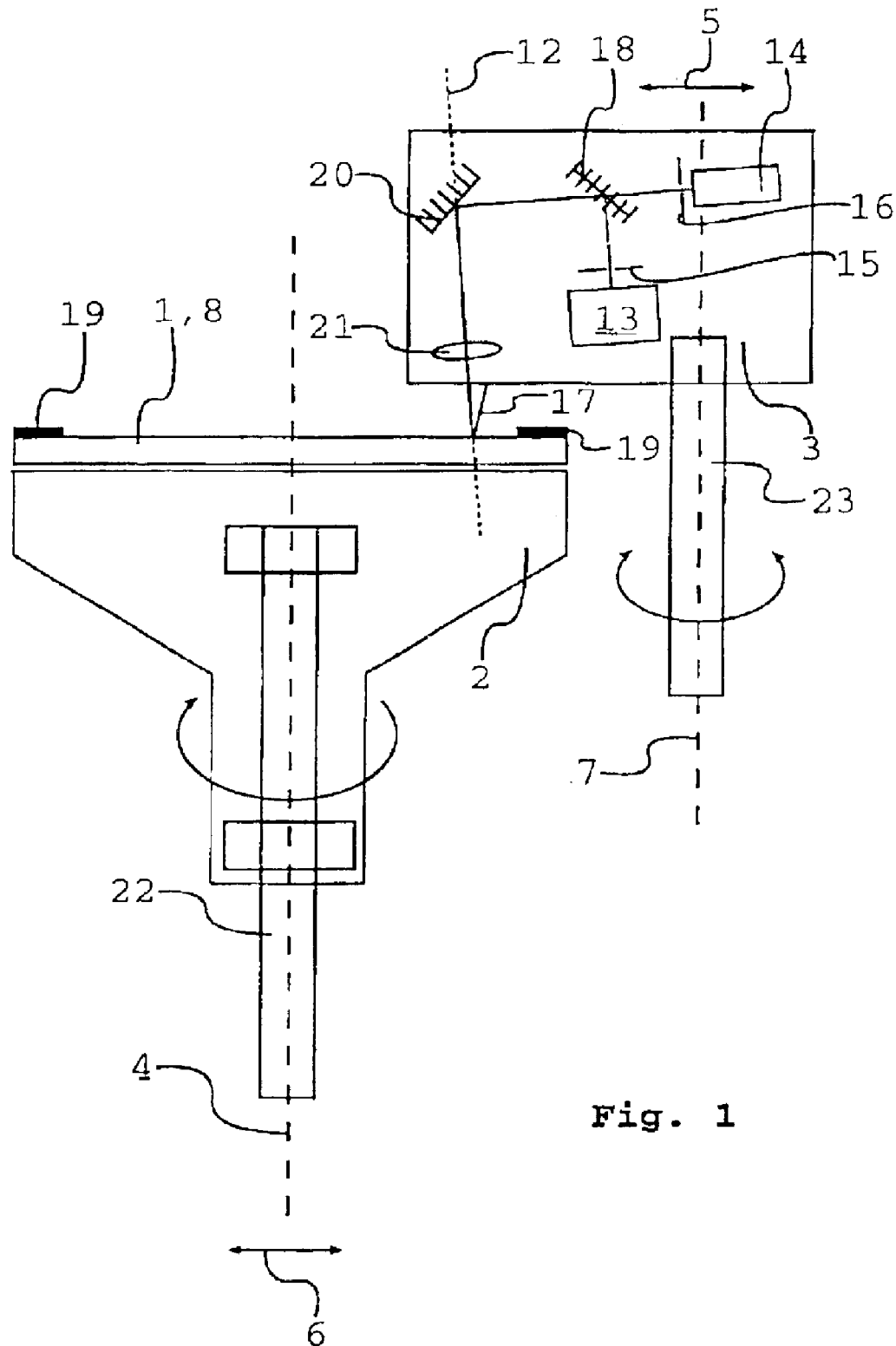
FIG. 1 shows, in a schematic general depiction, an exemplary embodiment of an apparatus according to the present invention for optical scanning of multiple specimens.

FIG. 1 shows an apparatus for optical scanning of multiple specimens 1 and/or specimen regions, the specimens being associated with a specimen receiving device 2 and optically scannable by a scanning device 3.

According to the present invention, specimen receiving device 2 is rotatable in one direction about an axis 4. It has to be understood that the specimen receiving device (2) is rotatable as well in opposite directions about the axis 4. Specimen receiving device 2 is guided during its rotation by pivot bearing rod 22. Scanning device 3 is linearly displaceable as shown by reference character 5, specifically in a radial direction. As an alternative to this, specimen receiving device 2 could also be displaceable in direction 6. Scanning device 3 could be arranged rotatably or pivotably about a further axis 7, guided in this case by a pivot bearing rod 23.

During the linear displacement of scanning device 3 in direction 5, the optical distance between specimen 1 and scanning device 3 remains substantially constant, since displacement direction 5 is arranged perpendicular to axis 4.

Specimen receiving device 2 has a constant rotation speed during data recording. A variable rotation speed of the specimen receiving device (2) is possible as well. Specimen receiving device 2 is halted only during specimen loading. Specimen receiving device 2 moreover has a large mass, is of rotationally symmetrical configuration, and receives a replaceable carousel insert 8.

Figure 2:
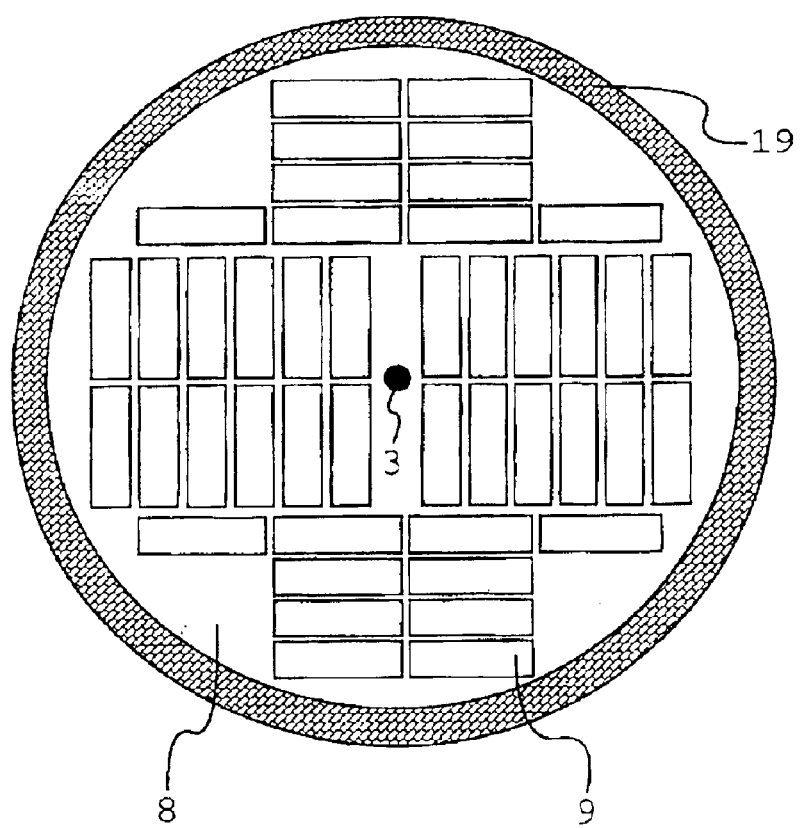
FIG. 2 schematically shows, in a schematic plan view, a carousel insert of the apparatus according to the present invention for optical scanning of multiple specimens.
Figure 3:
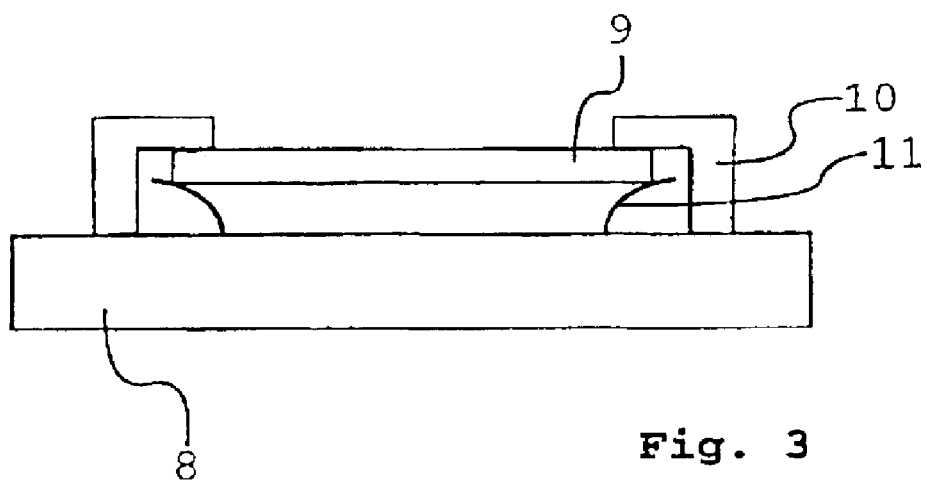
FIG. 3 shows, in a schematic side depiction, a carousel insert with specimen holders positioned therein.

FIG. 2 shows a carousel insert 8 that receives individual specimen holders 9. It is evident from FIG. 3 that the individual specimen holders 9 are positionable in a definable plane on carousel insert 8 with retaining means 10. The individual specimen holders 9 are pressed with springs 11 upward against retaining means 10. In this context, the contact surface of specimen holder 9 against retaining means 10 defines the plane in which the individual specimen holders are to be positioned. The surface of the rotating specimen receiving device 2 and the surfaces of specimen holders 9 present in the carousel insert always have a maximum deviation, in the direction of optical axis 12 of scanning device 3, that is less than 20 µm. Specimen receiving device 2 and carousel insert 8 are rotary parts that are manufactured with a corresponding precision-engineered accuracy. In particular, the arrangement of holding means 10 on carousel insert 8 is fabricated with corresponding accuracy. Each specimen holders 9 may be provided with a specific identifier. The specific identifier of the specimen holders 9 is configured in the form of a barcode.

Specimens 1 are scanned with a laser beam from laser 13. The detected light of specimens 1 is detected with a detector 14. The illumination and detection beam is stationary relative to scanning device 3. The laser is an argon-krypton (ArKr) laser, which emits laser light of different wavelengths. The optical elements in the beam path of scanning device 3 are selected such that the axial extent of the focus region of the laser beam in specimen region 1 is smaller than 40 µm, and the lateral extent is approximately 25 µm. The optical beam path in scanning device 3 is of confocal configuration. Excitation, pinhole 15 following laser 13 functions as a point illumination light source. Detection pinhole 16 preceding detector 14 functions as a detection aperture stop. The entire optical beam path of scanning device 3 is arranged in such a way that the incidence angle of the laser beam onto the surface of specimen holders 9 located in carousel insert 8 is 10 degrees, which is evident in schematic fashion from FIG. 1. Alternatively, only mirror 20 in conjunction with lens 21 could be arranged in such a way that the incidence angle equals 10 degrees. Because of the 10-degree incidence angle, principal reflection 17 occurring at the air/glass transition of specimen holders 9 is reflected out of the illumination and detection beam path. As a result, dichroic beam splitter 18 can be selected on the basis of its wavelength characteristic in terms of the fluorescent light to be detected, specifically so that undesired components of the principal reflection of the illuminating light from the air/glass transition do not need to be specially filtered out.

Carousel insert 8 shown in FIG. 2 has synchronization markings 19 that are detected by a photoelectric barrier (not depicted). The synchronization signals, in conjunction with the position signal of scanning device 3 moving in linear direction 5, make possible an association between the measured specimen detection signal and the corresponding local coordinates referred to carousel insert 8.

To display and/or document the data recording, for example on a monitor, a back-transformation of the measured image data present in cylindrical coordinates into Cartesian coordinates can be performed.

In conclusion, be it noted very particularly that the exemplary embodiments set forth above serve merely to describe the teaching claimed, but do not limit it to the exemplary embodiments.

The invention has been described in detail with particular reference to certain preferred embodiments thereof, but it will be understood that variations and modifications can be effected within the spirit and scope of the invention.

What is claimed is:

1. An optical scanning apparatus comprising:
   a replaceable specimen receiving device for receiving a carousel insert holding a plurality of specimens in a confocal scanning microscope, the specimen receiving device defining an axis of rotation and being rotatable about the axis of rotation; and
   a scanning device provided for optically scanning the plurality specimens, the scanning device defining a further axis and being rotatable about the further axis, the scanning device being arranged movably relative to the specimen receiving device, wherein the scanning device or the specimen receiving device is linearly displaceable, wherein at least one laser beam is provided for scanning the specimens, and wherein the laser beam defines a non-zero incidence angle on the surface of the specimen receiving device, and wherein the non-zero incidence angle is about 10 degrees.

2. The apparatus as defined in claim 1, wherein the scanning device defines a movement in a first radial direction and the specimen receiving device defines a movement in a second radial direction, and the relative movement between scanning device and specimen receiving device resulting from the first radial direction and the second radial direction is linear.

3. The apparatus as defined in claim 1, wherein an optical distance between a specimen and the scanning device remains substantially constant during a relative motion between the scanning device and the specimen receiving device.

4. The apparatus as defined in claim 1, wherein the specimen receiving device defines a rotation speed of the specimen receiving device, and the rotation speed is dependent on the relative position between the specimen receiving device and the scanning device.

5. The apparatus as defined in claim 4, wherein the rotation speed is dependent on a detected data stream of the scanning device.

6. The apparatus as defined in claim 1, wherein the specimen receiving device receives a single, replaceable specimen vessel.

7. The apparatus as defined in claim 1, wherein the carousel insert receives individual specimen holders.

8. The apparatus as defined in claim 7, wherein the individual specimen holders are positionable in a predefinable plane on the carousel insert with retaining means.

9. The apparatus as defined in claim 7, wherein the individual specimen holders are positioned resiliently.

10. The apparatus as defined in claim 1, wherein an auto focusing means is provided for maintaining the specimens in focus.

11. The apparatus as defined in claim 10, wherein the auto focusing means maintains the surface of the rotating specimen receiving device or of the specimen vessel or of the specimen holders located in the carousel insert always within a deviation of less than 20 $\mu$m in the direction of the optical axis of the scanning device.

12. The apparatus as defined in claim 1, wherein at least one laser beam is provided for scanning the specimens and at least one detector detects fluorescent light from the specimen.

13. The apparatus as defined in claim 12, wherein the laser beam scans in at least one direction.

14. The apparatus as defined in claim 12, wherein the laser beam is stationary relative to the scanning device.

15. The apparatus as defined in claim 12, wherein the laser beam provided for scanning can be of different wavelengths.

16. The apparatus as defined in claim 12, wherein the laser beam has an axial extent of the focus region in the specimen region of less than 40 $\mu$m.

17. The apparatus as defined in claims 12, wherein the laser beam has a lateral extent of the focus region in the specimen region in a range between 5 $\mu$m and 200 $\mu$m.

18. The apparatus as defined in claim 11, further comprising synchronization markers provided on the specimen receiving device or the specimen vessel or the carousel insert.

19. An optical scanning apparatus comprising:
   a replaceable specimen receiving device for receiving a carousel insert holding a plurality of specimens in a confocal scanning microscope, the specimen receiving device defining an axis of rotation and being rotatable about the axis of rotation; and
   a scanning device provided for optically scanning the plurality specimens, the scanning device defining a further axis and being rotatable about the further axis, the scanning device being arranged movably relative to the specimen receiving device, wherein the scanning device or the specimen receiving device is linearly displaceable, wherein at least one laser beam is provided for scanning the specimens, and wherein the laser beam defines a non-zero incidence angle on the surface of the specimen receiving device.

* * * * *